United States Patent Office 2,704,857
Patented Mar. 29, 1955

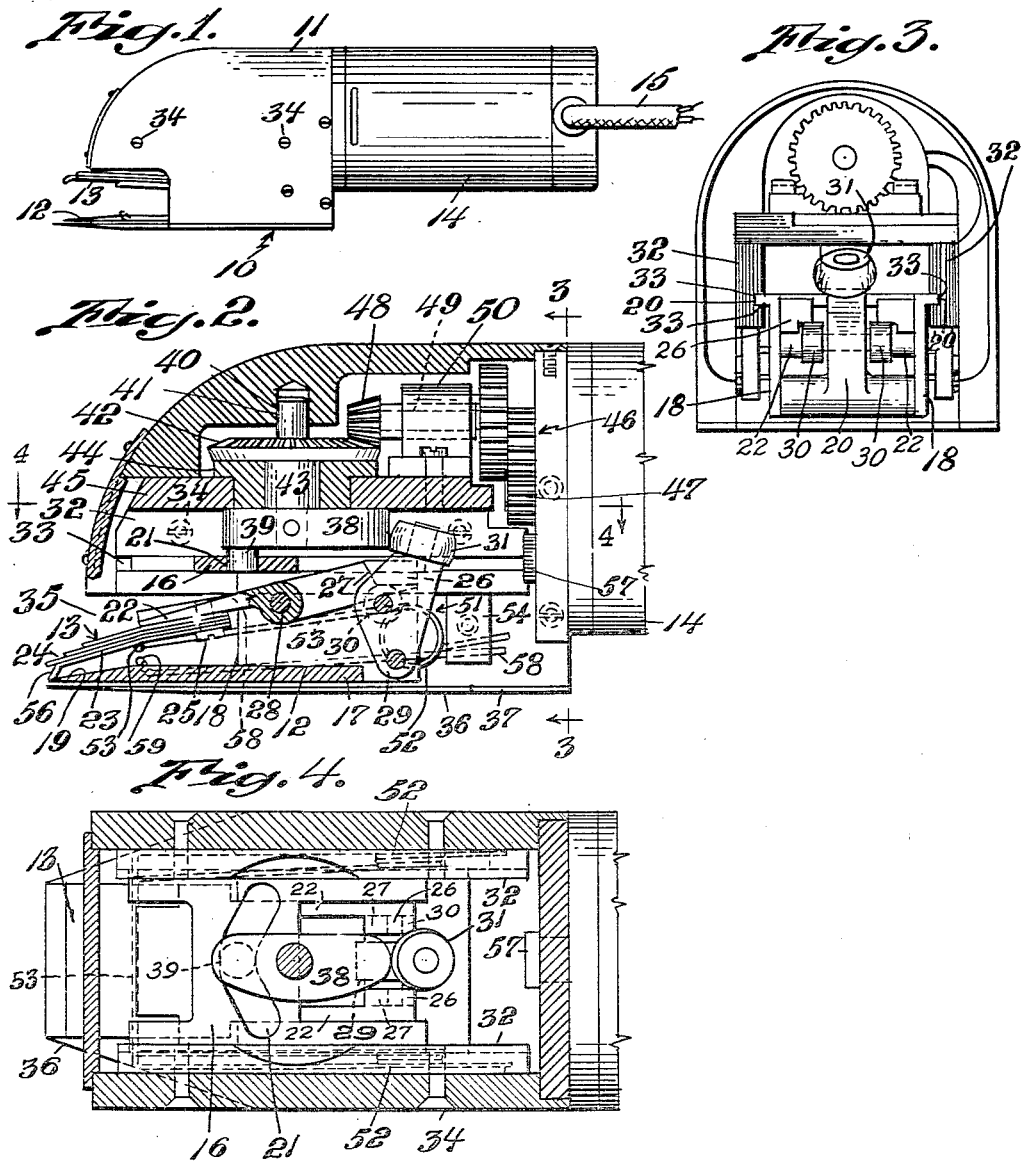

2,704,857

FEATHER PLUCKING DEVICE

Foster Fisher, Providence, R. I.

Application December 9, 1950, Serial No. 200,032

6 Claims. (Cl. 17—11.1)

This invention relates to a device for removing feathers in the dry state from a fowl.

An object of this invention is to provide a device of the above character which is of a size and shape to be normally moved into the feathers of the fowl and provided with reciprocating jaws arranged to grasp the feathers at practically their point of emergency from the skin so that even the shortest pin feathers may be readily plucked.

Another object of the invention is to provide plucking jaws arranged to firmly grasp all sizes of feathers without breaking the same.

Another object of this invention is to provide a plucking device in which but a single cam will be arranged both for reciprocating the plucking jaws and to move the same into feather gripping position.

A more specific object of the invention is to provide a feather plucking device so constructed as to provide for a very compact arrangement of the various elements thereof.

With these and other objects in view, the invention consists of certain novel features of construction, as will be more fully described and particularly pointed out in the appended claims.

In the accompanying drawings:

Figure 1 is a side elevational view of a plucking device embodying my invention;

Figure 2 is a longitudinal enlarged sectional view of the plucking device taken just off the center line of Figure 1;

Figure 3 is an edge view taken substantially along line 3—3 of Fig. 2; looking in the direction of the arrows thereon, and Figure 4 is a sectional view taken along line 4—4 of Fig. 2, looking in the direction of the arrows.

Referring to the drawings, particularly Figure 1, 10 designates generally a feather plucking device having a body 11 in which is housed a pair of plucking jaws 12 and 13 which are arranged to be reciprocated by means of a power source which, in the present instance, is an electric motor 14 which is attached at one end of the body 11 and is of a size to additionally provide a handle to be held in the hand of the operator whereby he may manually move and guide the device to grip the feathers of the fowl. The motor 14 is provided with a usual electric cord connector 15 which may have a plug connector (not shown) for connecting the cord to a convenient electric outlet. The switch (not shown) is located in the circuit for controlling the flow of electrical current from the supply.

The jaw 12 includes a frame having top, bottom, and side walls 16, 17, and 18 respectively. The bottom wall 17 extends a substantial distance beyond one end of the side walls 18 and with the forward end portion thereof made in a chisel formation so as to provide a feather engaging surface 19 which may be moved very close to the point where the feathers emerge from the skin of the fowl. The upper ends of the side walls 18 each have a right angularly, outwardly extending portion or lip 20 and the top wall 16 is provided with a cam slot 21. The jaw 13 which is the upper jaw comprises a support 22 at the forward end of which there is mounted a feather engaging element 23 consisting of a plate backed by a plurality of flat springs 24. The element 23 with the springs 24 is secured in position on the support 22 by means of cap screws 25. The other end of the support 22 is provided with a laterally extending bar 26 on the inner side of which there is provided a slanted surface 27 (see Figure 4). This upper jaw 13 is pivotally mounted to the side walls 18 as at 28. A lever 29 is pivotally mounted to the side walls 18 and extends upwardly therefrom and carries a pivotally mounted roller 30. At the upper end of this lever 29 there is also mounted a roller 31.

The pair of jaws 12, 13 are mounted for reciprocal movement in guides 32, each of which is provided with a slot 33 in which the lips 20 are received and guided thereby. The guides 32 are secured to the body 11 by means of screws 34. The body 11 is open at the front end as at 35 and is provided with a bottom plate 36 which has an opening 37 at the rear end portion thereof.

The said jaws are reciprocated by means of a cam 38 having an eccentrically mounted pin 39 thereon which extends into the cam slot 21 so as to engage the walls of the slot. The cam is attached to a shaft 40 which is journalled at its upper end portion in an opening 41 in the housing 11. A bevel gear 42 is attached to the shaft 40 so as to rotate therewith and its hub portion 43 is journalled in a bearing support 44 carried by a plate 45 attached to the body 11. The gear 42 is rotated as by means of a gear train designated generally 46 including a gear 47 attached to the shaft of the motor 14. Motion from the gear 47 is transmitted through the said train of gears to a bevel pinion 48 engaging with the gear 42. The gear 48 is carried by a shaft 49 which is journalled in the bearing support 50 attached to the said plate 45. Thus, upon rotation of the gear pinion 47, the bevel gear 42 will be likewise rotated to turn the cam 38 and the pin 39 thereon which through the cam slot 21 will reciprocate the said jaws 12 and 13.

The jaw 13 is biased to move to the open position by means of a torsion spring 51 which may be formed of a single length of wire, as shown, having opposite coils 52 connected by a U-shaped portion 53 the bight of which extends beneath the plate 23. The other ends of the coils are anchored in place by means of a plate 54 secured to the sides of the body 11.

The jaws are moved to the feather gripping position at the end of their forward stroke by the engagement of the cam 38 with the roller 31 which will swing the lever 29 about its pivot so as to move the roller 30 into engagement with the under side of the bar 26 (see Figure 3). This will swing the upper jaw 13 about its pivot 28 to move the end 56 thereof into engagement with such feathers as may be positioned on the surface 19. Near the end of the plucking stroke, the roller 31 will be engaged by a resilient abutment 57 positioned at the rear of the body 11 so as to swing the lever 29 about its pivot in a direction to move the roller 30 from engagement with the under surface of the bar 26 to position the roller 30 beyond the surface 27 whereby the spring 51 will move said jaws to the open position. In order to remove such feathers as may adhere to the surface 19, a scraper 58 is provided. This scraper in the instant disclosure is in the form of a U-shaped wire, the bight 59 of which is positioned to be adjacent to the upper side of the bottom wall 17. This scraper 58 may be attached in position by means of the plate 54.

It will be apparent that when moving the upper jaw 13 toward the jaws 19, the feathers of larger size will cause the resilient element 23 to yield while being moved into the closed position by the roller 30, thereby avoiding breakage of feathers and to assure that all feathers grasped will be removed from the fowl on the plucking stroke of the said jaws.

I claim:

1. A poultry plucking device, comprising a casing having an open end, a pair of feather plucking members mounted within said casing for reciprocation toward and away from said open end, means for pivoting at least one of said members toward the other of said members, feather cleaning means for said feather plucking members, said feather cleaning means extending transversely across at least one of said feather plucking members, and resilient means operatively connected with said cleaning means to constantly urge said one plucking member away from said other plucking member.

2. A device for plucking feathers comprising a casing, a pair of pivotally related feather-gripping jaws mounted for reciprocation, one of said jaws having a cam slot therein, a lever pivotally mounted on one of said jaws, said lever having a roller thereon movable into engagement with the other of said jaws for moving the same toward the other jaw into feather engaging position, a rotatable cam mounted in said casing and having a pin extending therefrom into said slot for engagement with the edges thereof for reciprocating said jaws, said lever having a portion thereof movable into engagement with a portion of said cam to rock the roller of said lever into engagement with the other of said jaws, and an abutment positioned on a plane parallel to the plane of reciprocation of said jaws to engage said lever and move said roller out of engagement with the said other jaw, spring means engaging each of said jaws to normally urge them apart, and a power source coupled to said cam for imparting movement thereto.

3. A poultry plucking device comprising a housing having a frame movably mounted therein, a jaw mounted in said frame and a complementary jaw pivoted in said frame, spring means interengaging said jaws to hold them in separated relationship, a lever pivoted on said frame and having means thereon engaging said pivoted jaw to cause closing of the same, a cam on said housing having means engaging said frame and said lever to cause sliding movement of said frame and closing movement of said pivoted jaw.

4. A device as set forth in claim 3 wherein one of said jaws comprises a plurality of flat spring strips.

5. A device as set forth in claim 3 wherein one of said jaws is resilient and the other has a chisel-edged feather engaging portion.

6. A poultry plucking device comprising a body of a size to be moved into the feathers of a fowl, a frame in said body, a pair of feather gripping jaws mounted in said frame for reciprocation toward and away from said body, one of said jaws being pivoted with respect to the other jaw, said other jaw being fixedly mounted on said frame, spring means engaging each of said jaws to normally urge them apart, cam means mounted in said body and coupled to said frame to cause reciprocation thereof in said body, a lever pivotally mounted on said frame on an axis between said jaws, said lever having a roller thereon movable into engagement with said pivoted jaw to close said jaws as said jaws reciprocate away from said body, and a power source coupled to said cam for imparting movement thereto.

References Cited in the file of this patent

UNITED STATES PATENTS

| | | |
|---|---|---|
| 1,939,469 | Simons | Dec. 12, 1933 |
| 2,010,988 | Harrison | Aug. 13, 1935 |
| 2,113,232 | Hinchliffe | Apr. 5, 1938 |
| 2,268,581 | Fisher | Jan. 6, 1942 |